United States Patent
Lu et al.

(10) Patent No.: US 10,259,203 B2
(45) Date of Patent: *Apr. 16, 2019

(54) MULTIPLE LAYER INTERLAYERS HAVING ENHANCED PROPERTIES

(71) Applicant: SOLUTIA INC., St. Louis, MO (US)

(72) Inventors: Jun Lu, East Longmeadow, MA (US); Yalda Farhoudi, Longmeadow, MA (US); Aristotelis Karagiannis, Amherst, MA (US); Wenjie Chen, Amherst, MA (US); Lora Lee Spangler, Belchertown, MA (US)

(73) Assignee: Solutia Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/839,077

(22) Filed: Dec. 12, 2017

(65) Prior Publication Data

US 2018/0099491 A1    Apr. 12, 2018

Related U.S. Application Data

(63) Continuation of application No. 14/886,469, filed on Oct. 19, 2015, now Pat. No. 9,931,821.

(51) Int. Cl.
*B32B 27/08* (2006.01)
*B32B 27/30* (2006.01)
(Continued)

(52) U.S. Cl.
CPC ............. *B32B 27/30* (2013.01); *B32B 3/263* (2013.01); *B32B 7/02* (2013.01); *B32B 17/10* (2013.01);
(Continued)

(58) Field of Classification Search
CPC ................ B32B 17/10; B32B 2250/05; B32B 2250/246; B32B 2250/40; B32B 2307/10; B32B 2307/102; B32B 2307/40; B32B 2307/558; B32B 2307/732; B32B 2309/02; B32B 2605/006; B32B 27/08;
(Continued)

(56) References Cited

U.S. PATENT DOCUMENTS 2,282,026 A    4/1939    Bren et al.
2,282,057 A    4/1939    Hopkins et al.
(Continued)

FOREIGN PATENT DOCUMENTS

EP    0 457 190 A1    11/1991
EP    1 281 690 A1    2/2003

OTHER PUBLICATIONS

Wade, B.E., "Vinyl Acetal Polymer," in the Encyclopedia of Polymer Science & Technology, $3^{rd}$ ed., vol. 8, pp. 381-399 (2003).
(Continued)

*Primary Examiner* — Lawrence D Ferguson
(74) *Attorney, Agent, or Firm* — Steven A. Owen (57) ABSTRACT

Multiple layer interlayers comprising pairs of alternating polymer layers are provided, along with methods of making and using the same. Multiple layer interlayers according to embodiments of the present invention may include more than three polymer layers and may exhibit desirable acoustic and optical properties, which may make them suitable for use in various types of multiple layer panels, including safety glass for automotive and architectural applications.

20 Claims, 4 Drawing Sheets

(51) Int. Cl.
  *B32B 17/10* (2006.01)
  *B32B 7/02* (2019.01)
  *B32B 27/22* (2006.01)
  *B32B 3/26* (2006.01)
  *B32B 27/18* (2006.01)
  *B32B 27/20* (2006.01)
  *B32B 27/42* (2006.01)

(52) U.S. Cl.
  CPC .............. *B32B 27/08* (2013.01); *B32B 27/18* (2013.01); *B32B 27/20* (2013.01); *B32B 27/22* (2013.01); *B32B 27/306* (2013.01); *B32B 27/42* (2013.01); *B32B 2250/05* (2013.01); *B32B 2250/246* (2013.01); *B32B 2250/40* (2013.01); *B32B 2307/10* (2013.01); *B32B 2307/102* (2013.01); *B32B 2307/40* (2013.01); *B32B 2307/558* (2013.01); *B32B 2307/732* (2013.01); *B32B 2309/02* (2013.01); *B32B 2605/006* (2013.01)

(58) Field of Classification Search
  CPC ......... B32B 27/18; B32B 27/20; B32B 27/22; B32B 27/30; B32B 27/306; B32B 27/42; B32B 3/263; B32B 7/02
  See application file for complete search history.

(56) References Cited

U.S. PATENT DOCUMENTS

| | | |
|---|---|---|
| 3,239,197 A | 3/1966 | Tollar et al. |
| 5,094,788 A | 3/1992 | Schrenk et al. |
| 5,190,826 A | 3/1993 | Asahina et al. |
| 5,340,654 A | 8/1994 | Ueda et al. |
| 5,728,472 A | 3/1998 | D'Errico |
| 7,510,771 B2 | 3/2009 | Lu |
| 2005/0153106 A1 | 7/2005 | Lansberry |
| 2006/0210776 A1 | 9/2006 | Lu |
| 2007/0128452 A1 | 6/2007 | Fisher |
| 2013/0236693 A1 | 9/2013 | Lu |
| 2014/0044941 A1 | 2/2014 | Shimamoto et al. |
| 2014/0227489 A1 | 8/2014 | Inui |
| 2016/0102181 A1 | 4/2016 | Lu |
| 2016/0160034 A1 | 6/2016 | Lu et al. |
| 2016/0361899 A1 | 12/2016 | Lu et al. |
| 2017/0106634 A1 | 4/2017 | Lu |

OTHER PUBLICATIONS

Notification of Transmittal of the International Search Report and the Written Opinion of the International searching Authority, or the Declaration dated Dec. 22, 2016 received in International Application No. PCT/US2016/056361.

Office Action dated Jun. 15, 2017 received in co-pending U.S. Appl. No. 14/886,469.

USPTO Notice of Allowance dated Nov. 17, 2017 for copending U.S. Appl. No. 14/886,469.

Notification of Transmittal of the International Search Report and the Written Opinion of the International searching Authority, or the Declaration dated Mar. 7, 2018 received in International Application No. PCT/US2017/066389.

Office Action notification dated Sep. 7, 2018 received co-pending U.S. Appl. No. 15/394,747.

MULTIPLE LAYER INTERLAYERS HAVING ENHANCED PROPERTIES

CROSS REFERENCE TO RELATED APPLICATIONS

This application is a continuation application which claims priority to U.S. Non-Provisional patent application Ser. No. 14/886,469, filed Oct. 19, 2015, the disclosure of which is herein incorporated by reference

BACKGROUND

1. Field of the Invention

This disclosure relates to polymeric interlayers and, in particular, to polymeric interlayers suitable for use in, for example, in multiple layer panels.

2. Description of Related Art

Poly(vinyl butyral) (PVB) is often used in the manufacture of polymer sheets that can be used as interlayers in multiple layer panels, including, for example, light-transmitting laminates such as safety glass. Safety glass generally refers to a transparent laminate that includes at least one polymer sheet, or interlayer, disposed between two sheets of glass. Safety glass is often used as a transparent barrier in architectural and automotive applications, and one of its primary functions is to absorb energy resulting from impact or a blow without allowing penetration of the object through the glass. In cases when the applied force is sufficient to break the glass, the polymeric interlayer disposed between the panels retains the sharp glass shards, which minimizes injury and damage to people or objects within the area enclosed by the glass. Safety glass may also provide other benefits, such as a reduction in ultraviolet (UV) and/or infrared (IR) radiation, and it may also enhance the aesthetic appearance of window openings through addition of color, texture, and the like. Additionally, safety glass with desirable acoustic properties has also been produced, which results in quieter internal spaces.

Interlayers used to form acoustic glass panels may include a single "core" layer sandwiched between two outer "skin" layers. Typically, the core layer is a softer layer having a lower glass transition temperature than the outer skin layers. Use of a softer layer enhances the ability of the interlayer to dissipate acoustic energy of the vibrating structure, thereby minimizing the transmission of sound through the panel. In order to sufficiently minimize sound transfer, the core layer of an acoustic interlayer must be thick enough to allow transverse shearing to take place within the laminated structure. Tri-layer acoustic interlayers with an insufficient core layer can fail to provide adequate sound dampening performance.

Multiple layer panels, including those formed with glass substrates, that utilize conventional acoustic interlayers may, under extreme processing and/or environmental conditions, develop visual defects called "iceflowers" or "snowflakes." These types of defects form in the presence of elevated temperatures and when excess air is trapped within the laminate and, more particularly, within the softer core layer. When a laminated panel is subjected to elevated temperatures and/or glass stress, any pockets of air remaining in the interlayer may form bubbles, which nucleate in the softer core layer and then spread throughout the polymer layers when the panel is exposed to extreme conditions. These types of defects are particularly problematic when the substrates used to form the multiple layer panel include mismatched glass, such as, tempered glass, heat strengthened glass, annealed glass panels, as well as glass panels having significant curvature, like windshields, that form so-called "bending gaps" where air pockets can accumulate.

Thus, a need exists for a multiple layer interlayer that resists defect formation, including iceflowers, while still exhibiting good optical properties and suitable acoustic performance. Such interlayers should be usable in a wide variety of applications, including automotive and aeronautical safety glass, as well as architectural panels and other polymeric laminates.

SUMMARY

One embodiment of the present invention concerns a multiple layer interlayer comprising a first polymer layer comprising a first poly(vinyl acetal) resin; a second polymer layer comprising a second poly(vinyl acetal) resin; a third polymer layer comprising a third poly(vinyl acetal) resin; a fourth polymer layer comprising a fourth poly(vinyl acetal) resin; and a fifth polymer layer comprising a fifth poly(vinyl acetal) resin. The second polymer layer is disposed between and in contact with each of the first and the third polymer layers and wherein the fourth polymer layer is disposed between and in contact with each of the third and the fifth polymer layers. Each of the second and the fourth polymer layers has a glass transition temperature that is at least 3° C. different than the glass transition temperature of at least one of the first, third, and the fifth polymer layers, and at least one of the second and the fourth polymer layers has a thickness of less than 50 microns.

Another embodiment of the present invention concerns a multiple layer interlayer comprising at least three pairs of alternating polymer layers. Each of the pairs of alternating polymer layers comprises a first polymer layer comprising a first poly(vinyl acetal) resin and at least one plasticizer, and a second polymer layer adjacent to the first polymer layer. The second polymer layer comprises a second poly(vinyl acetal) resin and at least one plasticizer. For at least one of the pairs, the first poly(vinyl acetal) resin has a residual hydroxyl content that is at least 2 weight percent different than the residual hydroxyl content of the second poly(vinyl acetal) resin and/or the first poly(vinyl acetal) resin has a residual acetate content that is at least 2 weight percent different than the residual acetate content of the second poly(vinyl acetal) resin. The interlayer has a sound transmission loss of at least 35 decibels (dB), measured according to ASTM E90 (2009) at a temperature of 20° C. and a frequency of 3150 Hz, with a test panel having a length of 80 centimeters and a width of 50 centimeters, formed from two clear glass panels each having a thickness of 2.3 mm.

Yet another embodiment of the present invention concerns a multiple layer interlayer comprising a first polymer layer comprising a first poly(vinyl acetal) resin and at least one plasticizer; a second polymer layer adjacent to and in contact with the first polymer layer, wherein the second polymer layer comprises a second poly(vinyl acetal) resin and at least one plasticizer; a third polymer layer adjacent to and in contact with the second polymer layer, wherein the third polymer layer comprises a third poly(vinyl acetal) resin and at least one plasticizer; a fourth polymer layer adjacent to and in contact with the third polymer layer, wherein the fourth polymer layer comprises a fourth poly(vinyl acetal) resin and at least one plasticizer; and a fifth polymer layer adjacent to and in contact with the fourth polymer layer, wherein the fifth polymer layer comprises a fifth poly(vinyl acetal) resin and at least one plasticizer. Each of the second and the fourth poly(vinyl acetal) resins has a residual hydroxyl content that is at least 2 weight percent different than the residual hydroxyl content of at least one of the first, third, and fifth poly(vinyl acetal) resins and/or wherein each of the second and the fourth poly(vinyl acetal) resins has a residual acetate content that is at least 2 weight percent different than the residual acetate content of at least one of the first, third, and fifth poly(vinyl acetal) resins. Each of the second and the fourth polymer layers has an average thickness of less than 50 microns.

BRIEF DESCRIPTION OF THE DRAWINGS

Various embodiments of the present invention are described in detail below with reference to the attached drawing Figures, wherein.

DETAILED DESCRIPTION

Polymer interlayers suitable for use in multiple layer panels, including safety glass and architectural panels, are described herein. According to some embodiments, the polymer interlayers described herein may be multiple layer interlayers that include one or more pairs of alternating polymer layers, each having different properties and/or compositions. One or more of the layers may comprise a relatively thin layer having, for example, a thickness of 75 microns or less, but the interlayer may still exhibit desirable optical and/or acoustic properties. Various embodiments of multiple layer interlayers, along with methods of making such interlayers, will be described in detail shortly. Multiple layer interlayers as described herein may be useful in various types of multiple layer panels, including, for example, those used in automotive, aircraft, and/or architectural applications. In some embodiments, multiple layer interlayers may be utilized in heads-up display (HUD) panels for use in automotive and aircraft applications.

As used herein, the terms "polymer layer" and "layer" refer to one or more polymer resins, optionally combined with one or more plasticizers, that have been formed into a sheet. Polymer layers may further include one or more additional additives and may be combined with one or more other layers to form an interlayer. As used herein, the term "interlayer" generally refers to a single or multiple layer polymer sheet that may be suitable for use with at least one rigid substrate to form a multiple layer panel. The terms "multiple layer" and "multilayer" refer to interlayers having two or more polymer layers, stacked upon one another, that are coextruded, laminated, or otherwise coupled to each other.

Each polymer layer of the multiple layer interlayers described herein may include one or more thermoplastic polymers. Examples of suitable thermoplastic polymers can include, but are not limited to, poly(vinyl acetal) resins, polyurethanes (PU), poly(ethylene-co-vinyl) acetates (EVA), polyvinyl chlorides (PVC), poly(vinylchloride-co-methacrylate), polyethylenes, polyolefins, ethylene acrylate ester copolymers, poly(ethylene-co-butyl acrylate), silicone elastomers, epoxy resins, and acid copolymers such as ethylene/carboxylic acid copolymers and ionomers thereof, derived from any of the previously-listed polymers, and combinations thereof. In some embodiments, one or more layers of a multiple layer interlayer can include a thermoplastic polymer can be selected from the group consisting of poly(vinyl acetal) resins, polyvinyl chloride, and polyurethanes. In certain embodiments, one or more of the polymer layers can include at least one poly(vinyl acetal) resin. Although generally described herein with respect to poly (vinyl acetal) resins, it should be understood that one or more of the above polymer resins could be included with, or in the place of, the poly(vinyl acetal) resins described below in accordance with various embodiments of the present invention.

Polyurethanes can have different hardnesses. An exemplary polyurethane polymer has a Shore A hardness less than 85 per ASTM D-2240. Examples of polyurethane polymers are AG8451 and AG5050, aliphatic isocyanate polyether based polyurethanes having glass transition temperatures less than 20° C. (commercially available from Thermedics Inc. of Woburn, Mass.). EVA polymers can contain various amounts of vinyl acetate groups. The desirable vinyl acetate content is generally from about 10 to about 90 mol %. EVA with lower vinyl acetate content can be used for sound insulation at low temperatures. The ethylene/carboxylic acid copolymers are generally poly(ethylene-co-methacrylic acid) and poly(ethylene-co-acrylic acid) with the carboxylic acid content from 1 to 25 mole %. Ionomers of ethylene/carboxylic acid copolymers can be obtained by partially or fully neutralizing the copolymers with a base, such as the hydroxide of alkali (sodium for example) and alkaline metals (magnesium for example), ammonia, or other hydroxides of transition metals such as zinc. Examples of ionomers of that are suitable include Surlyn® ionomers resins (commercially available from DuPont of Wilmington, Del.).

Examples of exemplary multilayer interlayer constructs include, but are not limited to, PVB//PVB//PVB, PVB//PVisoB//PVB, where PVisoB (poly(vinyl iso-butyral) layer comprises a single resin or two or more resins having different residual hydroxyl contents or different polymer compositions; PVC//PVB//PVC, PU//PVB//PU, Ionomer//PVB//Ionomer, Ionomer//PU//Ionomer, Ionomer//EVA//Ionomer, where the core layer PVB (including PVisoB), PU or EVA comprises a single resin or two or more resins having different glass transitions. Alternatively, the skin and core layers may all be PVB using the same or different starting resins. Other combinations of resins and polymers will be apparent to those skilled in the art.

When one or more polymer layers include at least one poly(vinyl acetal) resin, the poly(vinyl acetal) resin may be formed according to any known method. For example, poly(vinyl acetal) resins may be formed by acetalization of polyvinyl alcohol with one or more aldehydes in the presence of a catalyst. The resulting resin can then be separated, stabilized, and dried according to known methods such as, for example, those described in U.S. Pat. Nos. 2,282,057 and 2,282,026, as well as "Vinyl Acetal Polymers," in the *Encyclopedia of Polymer Science & Technology*, 3$^{rd}$ ed., Volume 8, pages 381-399, by B. E. Wade (2003). The resulting poly(vinyl acetal) resins may have a total percent acetalization of at least about 35, at least about 50, at least about 60, at least about 70, at least about 75, at least about 80, or at least about 85 weight percent, measured according to ASTM D-1396, unless otherwise noted. The total amount of aldehyde residues in a poly(vinyl acetal) resin can be collectively referred to as the acetal component, with the balance of the poly(vinyl acetal) resin being residual hydroxyl and residual acetate groups, which will be discussed in further detail below.

Poly(vinyl acetal) resins may include residues of one or more aldehydes and, in certain embodiments, may include residues of at least one $C_1$ to $C_{12}$ aldehyde or at least one $C_4$ to $C_8$ aldehyde. Examples of suitable $C_4$ to $C_8$ aldehydes can include, but are not limited to, butyl aldehyde (n-butyraldehyde or iso-butyraldehyde), 2-methylvaleraldehyde, n-hexyl aldehyde, 2-ethylhexyl aldehyde, n-octyl aldehyde, and combinations thereof. In other embodiments, the poly(vinyl acetal) resin may comprise residues of other aldehydes, including, but not limited to, cinnamaldehyde, hexylcinnamaldehyde, benzaldehyde, hydrocinnamaldehyde, 4-chlorobenzaldehyde, 4-t-butylphenylacetaldehyde, propionaldehyde, 2-phenylpropionaldehyde, and combinations thereof, alone or in combination with one or more of the other aldehydes described herein.

In some embodiments, the poly(vinyl acetal) resin present in one or more layers of the multiple layer interlayer can include at least about 20, at least about 30, at least about 40, at least about 50, at least about 60, or at least about 70 weight percent and/or not more than about 90, not more than about 85, not more than about 80, not more than about 75, not more than about 70, or not more than about 65 weight percent of residues of at least one $C_4$ to $C_8$ aldehyde, based on the total weight of aldehyde residues of the resin. Further, the poly(vinyl acetal) resin can include from 20 to 90 weight percent, 30 to 80 weight percent, or 40 to 70 weight percent of residues of at least one $C_4$ to $C_8$ aldehyde, based on the total weight of aldehyde residues of the resin. The $C_4$ to $C_8$ aldehyde may be selected from the group listed above, or it can be selected from the group consisting of n-butyraldehyde, iso-butyraldehyde, 2-ethylhexyl aldehyde, and combinations thereof. In certain embodiments, the poly(vinyl acetal) resin may be poly(vinyl butyral) and can include, for example, not more than about 30, not more than about 20, not more than about 10, not more than about 5, or not more than about 2 weight percent of residues of an aldehyde other than butyraldehyde, based on the total weight of all aldehyde residues of the resin.

When present, one or more layers of the multiple layer interlayer may include at least about 0.5, at least about 1, at least about 2, at least about 3, at least about 5, at least about 10, at least about 15, at least about 20, at least about 30, at least about 40, at least about 45, at least about 50, at least about 60, at least about 75, or at least about 80 weight percent of one or more poly(vinyl acetal) resins, based on the combined weight of all resins in the layer. In some embodiments, resins other than the poly(vinyl acetal) resin may be present in one or more polymer layers of the interlayer, and, when present, may be present in an amount of not more than about 20, not more than about 15, not more than about 10, not more than about 5, not more than about 2, or not more than about 1 weight percent, based on the combined weight of all resins in the layer.

Multiple layer interlayers of the present invention may include several different poly(vinyl acetal) resins. For example, a multiple layer interlayer may include at least a first poly(vinyl acetal) polymer layer and a second poly(vinyl acetal) polymer layer adjacent to the first poly(vinyl acetal) polymer layer. The first poly(vinyl acetal) polymer layer may comprise a first poly(vinyl acetal) resin and the second polymer layer comprises a second poly(vinyl acetal) resin. As used herein, the terms "first," "second," "third," and the like are used to describe various elements within the description and the claims, and these elements should not be limited by such terms. These terms are only used to distinguish one element from another and do not necessarily imply a specific order, or even a specific element. For example, a single element may be regarded as a "first" element in the description and a "second element" in the claims. Consistency is maintained within the description and for each independent claim and the claims depending therefrom, but such nomenclature is not necessarily intended to be limiting.

The first and second poly(vinyl acetal) resins present in adjacent polymer layers of the multiple layer interlayer can have different compositions. Similarly, when one or more layers of a multiple layer interlayer include a blend of two or more poly(vinyl acetal) resins, at least a first and second poly(vinyl acetal) resin may also have different compositions. For example, in some embodiments, the first poly(vinyl acetal) resin can have a residual hydroxyl content and/or residual acetate content different than the residual hydroxyl content and/or residual acetate content of the second poly(vinyl acetal) resin. As used herein, the terms "residual hydroxyl content" and "residual acetate content" refer to the amount of hydroxyl and acetate groups, respectively, that remain on a poly(vinyl acetal) resin after processing is complete. For example, poly(vinyl butyral) can be produced by hydrolyzing poly(vinyl acetate) to poly(vinyl alcohol), and then acetalizing the polyvinyl alcohol with butyraldehyde to form poly(vinyl butyral). In the process of hydrolyzing the poly(vinyl acetate), not all of the acetate groups are converted to hydroxyl groups, and residual acetate groups remain on the resin. Similarly, in the process of acetalizing the poly(vinyl alcohol), not all of the hydroxyl groups are converted to acetal groups, which also leaves residual hydroxyl groups on the resin. As a result, most poly(vinyl acetal) resins include both residual hydroxyl groups (as vinyl hydroxyl groups) and residual acetate groups (as vinyl acetate groups) as part of the polymer chain. The residual hydroxyl content and residual acetate content are expressed in weight percent, based on the weight of the polymer resin, and are measured according to ASTM D-1396, unless otherwise noted.

In some embodiments, the difference between the residual hydroxyl content of the first and second poly(vinyl acetal) resins present in adjacent layers of the multiple layer interlayer could be at least about 2, at least about 5, at least about 10, at least about 12, at least about 15, at least about 20, or at least about 30 weight percent. As used herein, the terms "weight percent different" or "the difference is at least . . . weight percent" refer to the difference between two given weight percentages, calculated by subtracting the one number from the other. For example, a poly(vinyl acetal) resin having a residual hydroxyl content of 12 weight percent has a residual hydroxyl content that is 2 weight percent lower than a poly(vinyl acetal) resin having a residual hydroxyl content of 14 weight percent (14 weight percent−12 weight percent=2 weight percent). As used herein, the term "different" can refer to a value that is higher than or lower than another value.

In some embodiments, at least one of the first and second poly(vinyl acetal) resins can have a residual hydroxyl content of at least about 14, at least about 14.5, at least about 15, at least about 15.5, at least about 16, at least about 16.5, at least about 17, at least about 17.5, at least about 18, at least about 18.5, at least about 19, or at least about 19.5 and/or not more than about 45, not more than about 40, not more than about 35, not more than about 33, not more than about 30, not more than about 27, not more than about 25, not more than about 23.5, not more than about 22.5, not more than about 21.5, not more than about 21, not more than about 20.5, or not more than about 20 weight percent, or in the range of from 14 to 45 weight percent, 16 to 30 weight percent, 18 to 25 weight percent, 18.5 to 23.5 weight percent, or 19.5 to 22.5 weight percent.

The other of the first and second poly(vinyl acetal) resins may have a residual hydroxyl content of at least about 8, at least about 9, at least about 10, or at least about 11 weight percent and/or not more than about 16, not more than about 15, not more than about 14.5, not more than about 13, not more than about 11.5, not more than about 11, not more than about 10.5, not more than about 10, not more than about 9.5, or not more than about 9 weight percent, or in the range of from 8 to 16 weight percent, 9 to 15 weight percent, 9.5 to 14.5 weight percent, or 10 to 13 weight percent.

The first and/or second poly(vinyl acetal) resins can be selected so that the difference between the residual hydroxyl content of the first and second poly(vinyl acetal) resins falls within one or more of the ranges mentioned previously. Further, one or more other poly(vinyl acetal) resins may also be present in one or more additional layers of the interlayer, and these additional resins may also have a residual hydroxyl content within one or more of the ranges above. Such additional poly(vinyl acetal) resins may have a residual hydroxyl content that is the same as, or different than, the residual hydroxyl content of the first and/or second poly (vinyl acetal) resins present in the first and second polymer layers of a multiple layer interlayer.

In some embodiments, at least one of the first and second poly(vinyl acetal) resins can have a residual acetate content different than the other. For example, in some embodiments, the difference between the residual acetate content of the first and second poly(vinyl acetal) resins can be at least about 2, at least about 3, at least about 4, at least about 5, at least about 8, or at least about 10 weight percent. At least one of the poly(vinyl acetal) resins may have a residual acetate content of not more than about 4, not more than about 3, not more than about 2, or not more than about 1 weight percent, measured as described above. Alternatively, or in addition, at least one of the first and second poly(vinyl acetal) resins can have a residual acetate content of at least about 5, at least about 8, at least about 10, at least about 12, at least about 14, at least about 16, at least about 18, at least about 20, or at least about 30 weight percent. In other embodiments, both the first and the second poly(vinyl acetyl) resins can have a residual acetate content of not more than about 35, not more than about 30, not more than about 20, not more than about 18, not more than about 16, not more than about 14, not more than about 12, not more than about 10, not more than about 8, not more than about 5, not more than about 2, or not more than about 1 weight percent.

In some embodiments, the difference in the residual acetate content between the first and second poly(vinyl acetal) resins can be not more than about 8, not more than about 6, not more than about 5, not more than about 4, not more than about 3, not more than about 2, not more than about 1, or not more than about 0.5 weight percent, measured as described above. Additional poly(vinyl acetal) resins present other layers of the interlayer can have a residual acetate content within one or more of the ranges described previously, and may have a residual acetate content different than, or the same as, the residual acetate content of the first and/or second poly(vinyl acetal) resins present in, for example, the first and/or second polymer layers.

Further, at least one of the polymer layers of the multiple layer interlayer can include at least one plasticizer. Depending on the specific composition of the polymer layer, the plasticizer may be present in an amount of at least about 5, at least about 10, at least about 15, at least about 20, at least about 25, at least about 30, at least about 35, at least about 40, at least about 45, at least about 50, at least about 55, at least about 60, at least about 65, at least about 67, or at least about 70 parts per hundred parts of resin (phr) and/or not more than about 120, not more than about 110, not more than about 105, not more than about 100, not more than about 95, not more than about 90, not more than about 85, not more than about 75, not more than about 70, not more than about 65, not more than about 60, not more than about 55, not more than about 50, not more than about 45, or not more than about 40 phr. Further, one or more polymer layers in the multiple layer interlayer can have a plasticizer content in one of more of the following ranges: 5 to 120 phr, 10 to 110 phr, 20 to 90 phr, 25 to 75 phr, 5 to 50 phr, 15 to 45 phr, 25 to 40 phr, 45 to 120 phr, 55 to 90 phr, 60 to 85 phr, or 65 to 75 phr.

As used herein, the term "parts per hundred parts of resin" or "phr" refers to the amount of plasticizer present as compared to one hundred parts of resin, on a weight basis. For example, if 30 grams of plasticizer were added to 100 grams of a resin, the plasticizer would be present in an amount of 30 phr. If the polymer layer includes two or more resins, the weight of plasticizer is compared to the combined amount of all resins present to determine the parts per hundred resin. Further, when the plasticizer content of a layer is provided herein, it is provided with reference to the amount of plasticizer in the mix or melt that was used to produce the layer or interlayer.

Examples of plasticizers suitable for use in the interlayers of the present invention can include, but are not limited to, triethylene glycol di-(2-ethylhexanoate) ("3GEH"), triethylene glycol di-(2-ethylbutyrate), triethylene glycol diheptanoate, tetraethylene glycol diheptanoate, tetraethylene glycol di-(2-ethylhexanoate) ("4GEH"), dihexyl adipate, dioctyl adipate, hexyl cyclohexyladipate, diisononyl adipate, heptylnonyl adipate, di(butoxyethyl) adipate, and bis (2-(2-butoxyethoxy)ethyl) adipate, dibutyl sebacate, dioctyl sebacate, dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, 2,2,4-trimethyl-1,3-pentanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexanoate), ethoxylated nonylphenol, and mixtures thereof. The plasticizer may be selected from the group consisting of triethylene glycol di-(2-ethylhexanoate), tetraethylene glycol di-(2-ethylhexanoate) and mixtures thereof, or the plasticizer can comprise triethylene glycol di-(2-ethylhexanoate).

Adjacent polymer layers that include different poly(vinyl acetal) resins that have different residual hydroxyl contents and/or residual acetate contents may also, when combined with at least one plasticizer, ultimately include different amounts of plasticizer. As a result, adjacent polymer layers that include poly(vinyl acetal) resins having different compositions may also have different properties. Although not wishing to be bound by theory, it is assumed that the compatibility of a given plasticizer with a poly(vinyl acetal) resin can depend, at least in part, on the composition of the resin, and, in particular, on its residual hydroxyl content. Overall, poly(vinyl acetal) resins with higher residual hydroxyl contents tend to exhibit a lower compatibility (or capacity) for a given plasticizer as compared to similar resins having a lower residual hydroxyl content. As a result, poly(vinyl acetal) resins with higher residual hydroxyl contents tend to be less plasticized and exhibit higher stiffness than similar resins having lower residual hydroxyl contents. Conversely, poly(vinyl acetal) resins having lower residual hydroxyl contents may tend to, when plasticized with a given plasticizer, incorporate higher amounts of plasticizer, which may result in a softer polymer layer that exhibits a lower glass transition temperature than a similar resin having a higher residual hydroxyl content. Depending on the specific resin and plasticizer, these trends could be reversed.

In some embodiments, the first polymer layer may include a first poly(vinyl acetal) resin and at least one plasticizer, and the second polymer layer, which is adjacent to the first polymer layer, may comprise a second poly(vinyl acetal) resin and at least one plasticizer. The first and second plasticizer can be the same type of plasticizer, or the first and second plasticizers may be different. In some embodiments, at least one of the first and second plasticizers may also be a blend of two or more plasticizers, which can be the same as or different than one or more other plasticizers present in the other plasticizer or plasticizers present in the other layers of the interlayer.

In some embodiments, the first and second polymer layers can have different plasticizer contents. For example, the difference in plasticizer content between first and second adjacent polymer layers can be at least about 2, at least about 5, at least about 8, at least about 10, at least about 12, or at least about 15 phr. In many embodiments, the polymer layer that includes the resin having a lower hydroxyl content can have the higher plasticizer content. In order to control or retain other properties of the polymer layer or interlayer, the difference in plasticizer content between adjacent first and second polymer layers may be not more than about 40, not more than about 30, not more than about 25, not more than about 20, or not more than about 17 phr. In other embodiments, the difference in plasticizer content between the first and second polymer layers can be at least about 40, at least about 50, at least about 60, or at least about 70 phr.

When two poly(vinyl acetal) resins having different levels of residual hydroxyl content are each blended with a plasticizer and formed into adjacent polymer layers, the plasticizer may partition between the adjacent polymer layers within the interlayer, such that more plasticizer can be present in the layer having the lower residual hydroxyl content and less plasticizer may be present in the layer having the higher residual hydroxyl content. Ultimately, a state of equilibrium is achieved between the two polymer layers. The correlation between the residual hydroxyl content of a poly(vinyl acetal) resin and plasticizer compatibility/capacity can facilitate addition of a proper amount of plasticizer to the polymer resin. Such a correlation also helps to stably maintain the difference in plasticizer content between two or more resins when the plasticizer would otherwise migrate between the resins.

In addition to a plasticizer, one or more of the polymer layers may also include other additives that impart particular properties or features to the interlayer. Such additives can include, but are not limited to, dyes, pigments, stabilizers such as ultraviolet stabilizers, antioxidants, anti-blocking agents, flame retardants, IR absorbers or blockers such as indium tin oxide, antimony tin oxide, lanthanum hexaboride ($LaB_6$) and cesium tungsten oxide, processing aides, flow enhancing additives, lubricants, impact modifiers, nucleating agents, thermal stabilizers, UV absorbers, dispersants, surfactants, chelating agents, coupling agents, adhesives, primers, reinforcement additives, fillers, and combinations thereof.

Additionally, in some embodiments, at least one of the layers can include one or more adhesion control agents ("ACAs") in order to control the adhesion of the sheet to glass or other rigid substrate. In various embodiments, the amount of ACAs present in the polymer layer may be at least about 0.003, at least about 0.01, at least about 0.025 and/or not more than about 0.15, not more than about 0.10, or not more than about 0.04 phr, or in the range of from 0.003 to 0.15 phr, 0.01 to 0.10 phr, 0.025 to 0.040 phr. Suitable ACAs can include, but are not limited to, sodium acetate, potassium acetate, magnesium bis(2-ethyl butyrate), magnesium bis(2-ethylhexanoate), and combinations thereof, as well as the ACAs disclosed in U.S. Pat. No. 5,728,472, for example.

As a result of having different compositions, the adjacent first and second poly(vinyl acetal) polymer layers may exhibit different properties. For example, in some embodiments, the first and second polymer layers can have different glass transition temperatures. The glass transition temperature, or $T_g$, of a polymeric material is the temperature that marks the transition from the glass state of the polymer to the rubbery state. Glass transition is determined by dynamic mechanical thermal analysis (DMTA), which measures the storage (elastic) modulus (G') in Pascals, loss (viscous) modulus (G") in Pascals, and the tan delta (G"/G') of the specimen as a function of temperature at an oscillation frequency of 1 Hz under shear mode and temperature sweep rate of 3° C./min. The glass transition temperature is then determined by the position of the tan delta peak on the temperature scale.

According to some embodiments, the first poly(vinyl acetal) polymer layer can have a glass transition temperature that is at least about 3, at least about 5, at least about 8, at least about 10, at least about 12, at least about 15, at least about 18, at least about 20, at least about 22, or at least about 25° C. higher or lower than the glass transition temperature of the adjacent second poly(vinyl acetal) polymer layer. One of the first and second polymer layers can have a glass transition temperature of at least about 26, at least about 28, at least about 30, at least about 33, or at least about 35° C. and/or not more than about 70, not more than about 65, not more than about 60, not more than about 55, or not more than about 50° C., or in the range of from 26 to 70° C., 30 to 60° C., or 35 to 50° C. The other of the first and second poly(vinyl acetal) resins can have a glass transition temperature of not more than 25, not more than about 20, not more than about 15, not more than about 10, not more than about 5, not more than about 0, not more than about −5, or not more than about −10° C.

In addition to the first and second poly(vinyl acetal) polymer layers, other layers present in the multiple layer interlayer can have a glass transition temperature similar to or different than the glass transition temperature of the first or second poly(vinyl acetal) polymer layers. For example, in some embodiments, a multiple layer interlayer can include at least a third poly(vinyl acetal) polymer layer, adjacent to the second poly(vinyl acetal) polymer layer, and the second poly(vinyl acetal) polymer layer can be disposed between and in contact with each of the first and third poly(vinyl acetal) polymer layers. The third poly(vinyl acetal) polymer layer can have a glass transition temperature similar to the glass transition temperature of the first poly(vinyl acetal) polymer layer. In some embodiments, the third polymer layer can have a glass transition temperature that is at least about 3, at least about 5, at least about 8, at least about 10, at least about 12, at least about 15, at least about 18, at least about 20, at least about 22, or at least about 25° C. higher or lower than the glass transition temperature of the adjacent second poly(vinyl acetal) polymer layer.

Figure 1:
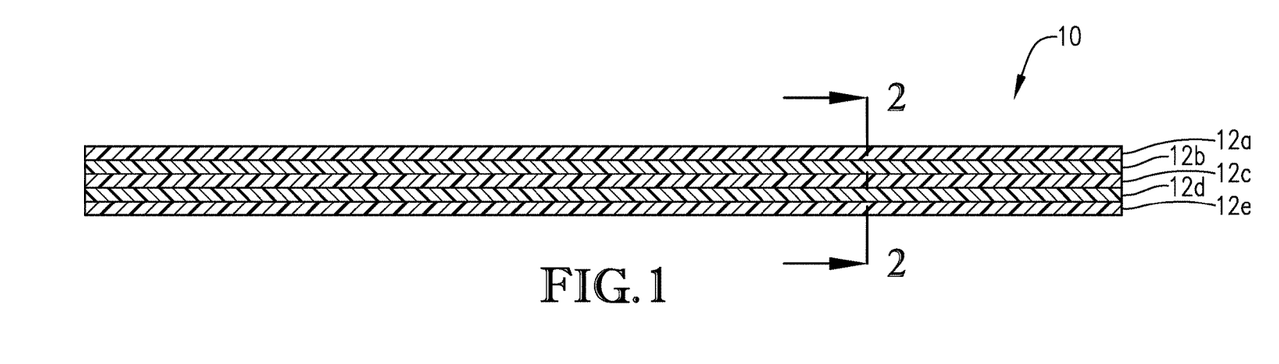
FIG. 1 is a cross-sectional view of a multiple layer interlayer 10 configured in accordance to one embodiment of the present invention.
Figure 2:
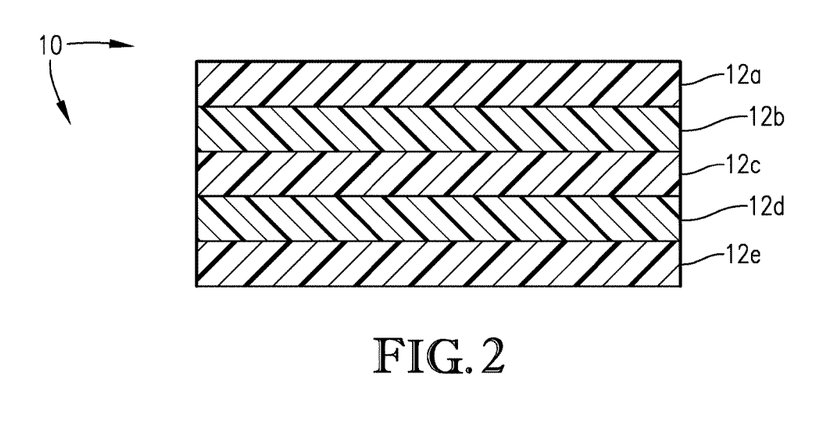
FIG. 2 is a cross-sectional view of the multiple layer interlayer 10 shown in FIG. 1.

In certain embodiments, a multiple layer interlayer of the present invention can include more than three layers. One example of a multiple layer interlayer 10 having more than three layers is shown in FIGS. 1 and 2. As shown in the embodiment depicted in FIGS. 1 and 2, the interlayer 10 can include respective first, second, and third poly(vinyl acetal) polymer layers 12a, 12b, and 12c. In some embodiments, the multiple layer interlayer can also include a fourth and a fifth poly(vinyl acetal) polymer layer, shown in FIGS. 1 and 2 as layers 12d and 12e. In some embodiments, interlayer 10 may have alternating polymer layers, so that the first, third, and fifth poly(vinyl acetal) polymer layers 12a, 12c, and 12e have similar properties and/or compositions and the second and fourth poly(vinyl acetal) polymer layers 12b and 12d have similar properties and/or compositions. Additional details of multiple layer interlayers having a plurality of alternating polymer layers are provided below.

The multiple layer interlayers described herein can include any suitable number of polymer layers. In some embodiments, the interlayers can have n total polymer layers, wherein n is an integer having a value of at least 5. In some embodiments, n can be an integer having a value of at least 6, at least 7, at least 8, at least 9, at least 10, at least 11, at least 15, at least 25, at least 35, at least 55, at least 75, at least 125, at least 175, at least 225, at least 275, at least 325, at least 375, at least 425, or at least 475 and/or not more than 2450, not more than 2050, not more than 1025, not more than 975, not more than 875, not more than 775, not more than 675, not more than 575, or not more than 525, not more than 425, not more than 325, not more than 225, not more than 125, not more than 75, not more than 55, not more than 45, not more than 35, not more than 30, not more than 25, not more than 20, not more than 17, not more than 15, not more than 13, not more than 11, or not more than 9. Further, n can have a value in the range of from 5 to 55, from 5 to 35, from 5 to 25, from 7 to 25, from 7 to 17, from 9 to 15, from 9 to 13, or from 9 to 11, or n can have a value in the range of from 9 to 75, from 15 to 55, from 25 to 45, or n can have a value in the range of from 50 to 2450, from 75 to 1025, from 125 to 975, from 325 to 775, or from 425 to 575.

When the adjacent polymer layers of a multiple layer interlayer having n total polymer layers have different compositions, every other layer (i.e., the alternating layers) may have similar compositions and/or properties. Therefore, in some embodiments, at least one polymer layer may have properties similar to one or more other polymer layers within the interlayer. For example, in some embodiments, the total number of layers having a glass transition temperature that is at least about 3, at least about 5, at least about 8, at least about 10, at least about 12, at least about 15, at least about 18, at least about 20, at least about 22, or at least about 25° C. lower than the glass transition temperature of at least one of the n total polymer layers in a multiple layer interlayer can be equal to (n−1)/2, if n is an odd number or n/2 if n is an even number. Similarly, in some embodiments, the number of poly(vinyl acetal) polymer layers that include a poly(vinyl acetal) resin having a residual hydroxyl content and/or residual acetate content that is at least about 2, at least about 3, at least about 4, at least about 5, at least about 6, or at least about 8 weight percent lower than at least one of the n total poly(vinyl acetal) polymer layers can be equal to (n−1)/2 if n is an odd number or n/2 if n is an even number. In certain embodiments, the polymer layers having the lower glass transition temperature may also be the layers having the lower residual hydroxyl content and/or having a higher residual acetate content.

Alternating polymer layers 12a-e may be considered to be arranged in several pairs, with two adjacent layers of alternating composition making up each pair. Although shown in FIGS. 1 and 2 as including two pairs (e.g., 12a,b and 12c,d) of alternating polymer layers, interlayers according to embodiments of the present invention can include at least about 2, at least about 3, at least about 4, at least about 5, at least about 6, at least about 8, at least about 10, at least about 12, or at least about 15, or more pairs of alternating polymer layers. As shown in FIGS. 1 and 2, each pair of alternating polymer layers respectively includes one of polymer layers 12a and 12c (e.g., the "first set" of polymer layers) and one of polymer layers 12b and 12d (e.g., the "second set" of polymer layers). Each of the polymer layers in the first set of polymer layers 12a,c and each of the polymer layers in the second set of polymer layers 12b,d may have similar compositions and/or properties, while the properties and/or compositions of the adjacent polymer layers 12a,b and 12c,d may be different from one another, as discussed in detail previously.

As also shown in FIGS. 1 and 2, multiple layer interlayer 10 can include an unpaired cap layer, shown as polymer layer 12e, located adjacent to the polymer layer 12d of the terminal pair of alternating polymer layers 12c,d. Cap layer 12e may have a composition similar to one or more of the other polymer layers 12a-d, or may have a composition different from at least one, or each, of the other polymer layers 12a-d of interlayer 10. Although shown in FIGS. 1 and 2 as being a single layer, cap layer 12e could itself be a multiple layer polymer sheet including at least 2, at least 3, at least 4, at least 5 or more polymer layers. When cap layer 12e includes multiple layers, at least some of the polymer layers may have a composition similar to the first set of polymer layers 12a,c, and at least some of the polymer layers may have a composition similar to the second set of polymer layers 12b,d of interlayer 10. According to such embodiments, cap layer 12e may be configured to maintain the pattern of alternating polymer layers set forth in interlayer 10. In other embodiments (not shown), at least some, or all, of the polymer layers of cap layer 12e may have compositions entirely different from the compositions of any of the polymer layers 12a-d of interlayer 10.

When cap layer 12e is a single polymer layer and has a composition similar to the composition of the first set of polymer layers 12a,c, each of polymer layers 12a,c,e may have a glass transition temperature that is at least 3° C. higher than the glass transition temperature of the second set of second polymer layers 12b,d, such that the glass transition temperature of the layer 12d adjacent to cap layer 12e is at least 3° C. lower than the glass transition temperature of cap layer 12e. In some embodiments, cap layer 12e may comprise, for example, a poly(vinyl acetal) resin having a higher residual hydroxyl content than the poly(vinyl acetal) resin in the adjacent polymer layer 12d, and/or cap layer 12e may have a lower plasticizer content than adjacent polymer layer 12d. When present, a "stiff" cap layer 12e may provide interlayer 10 with improved properties, including enhanced impact strength, and/or may facilitate handling of interlayer 10 during post-processing treatment, such as embossing, and/or during formation of a multiple layer panel. Additional details regarding methods of making multiple layer interlayers according to various embodiments of the present invention will be discussed shortly.

In various embodiments, multiple layer interlayers of the present invention may have an overall thickness of at least about 125, at least about 250, at least about 350, at least about 400, at least about 450, at least about 500, at least about 550, or at least about 600 microns and/or not more than about 2540, not more than about 2290, not more than about 1520, not more than about 890, not more than about 850, not more than about 760 microns, or the overall thickness of the multiple layer interlayer can be in the range of from 350 to 2540 microns, 400 to 1520 microns, 450 to 890 microns, or 600 to 850 microns. Each of the individual polymer layers of the multiple layer interlayer can have a thickness of at least about 0.05, at least about 0.1, at least about 0.25, at least about 0.5, at least about 1, at least about 2, at least about 3, at least about 4, at least about 5, at least about 10, at least about 15, at least about 20, at least about 25, at least about 30, at least about 35, at least about 40, or at least about 45 microns and/or less than about 75, less than about 65, less than about 60, less than about 55, less than about 50, less than about 49, less than about 45, less than about 40, less than about 35, less than about 30, less than about 25, less than about 20, less than about 15, less than about 10, less than about 5, less than about 4, less than about 3, less than about 2, less than about 1, less than about 0.5, less than about 0.1 microns. Further, the individual polymer layers can have a thickness in the range of from 0.05 to 75 microns, 0.1 to 65 microns, or 1 to 49 microns.

In some embodiments, two or more of the individual polymer layers of the multiple layer interlayer can have similar thicknesses, such that, for example, the thicknesses of the layers are within about 2, within about 5, within about 10, within about 15, or within about 20 microns of one another. Several of the individual layers can have a similar thickness such that, in some embodiments, at least about 5, at least about 10, at least about 30, at least about 40, at least about 50, at least about 60, at least about 70, at least about 80, at least about 90, at least about 95, or at least about 97 percent of the total number of polymer layers, rounded up to the nearest integer, can have a thickness within about 20, within about 15, within about 10, within about 5, within about 2, within about 1.5, within about 1, or within about 0.5 microns of the average thickness of all polymer layers in the interlayer.

In some embodiments, two or more individual polymer layers may have a thickness different from one or more of the other polymer layers in the interlayer. For example, at least one of the polymer layers can have a thickness that is at least about 3, at least about 3.5, at least about 4, or at least about 5 microns different than the thickness of one or more of the other polymer layers in the interlayer. Further, in some embodiments, at least about 50, at least about 55, at least about 60, or at least about 65 percent of all of the polymer layers in the multiple layer interlayer can have a thickness that is at least about 3 microns different than the average thickness of all polymer layers. According to other embodiments, however, not more than about 20, not more than about 10, not more than about 5, or not more than about 1 percent of the total number of polymer layers in a multiple layer interlayer can have a thickness that is at least about 3 microns different than the average thickness of all of the polymer layers.

Multiple layer interlayers as described herein can comprise generally flat interlayers having substantially the same thickness along the length, or longest dimension, and/or width, or second longest dimension, of the sheet. In some embodiments, however, the multiple layer interlayers of the present invention can be tapered, or wedge-shaped, interlayers that comprise at least one tapered zone having a wedge-shaped profile. Tapered interlayers have a changing thickness profile along at least a portion of the length and/or width of the sheet, such that, for example, at least one edge of the interlayer has a thickness greater than the other. When the interlayer is a tapered interlayer, at least 1, at least 2, at least 3, at least 4 or more of the individual polymer layers may include at least one tapered zone. Tapered interlayers may be particularly useful in, for example, heads-up display (HUD) panels in automotive and aircraft applications.

Figure 3:
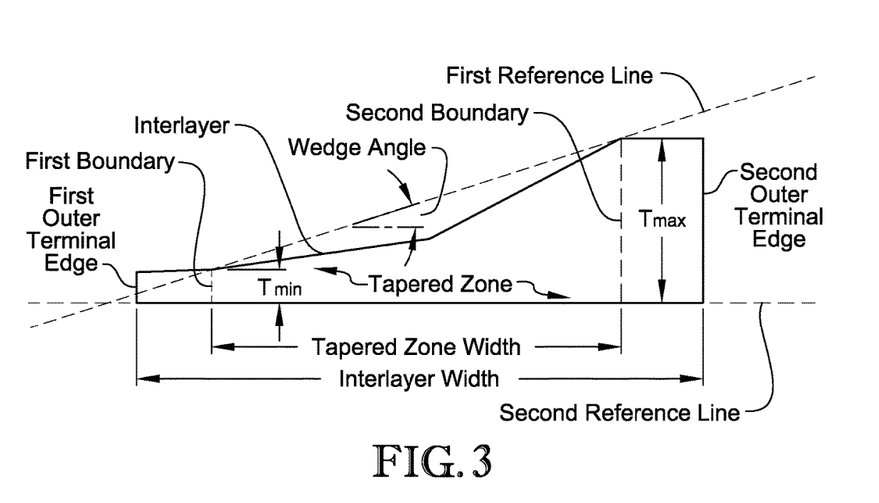
FIG. 3 is a cross-sectional view of a tapered interlayer configured in accordance with one embodiment of the present invention, where various features of the tapered interlayer are labeled for ease of reference.

Turning now to FIGS. 3 through 10, several embodiments of tapered interlayers according to the present invention are provided. FIG. 3 is a cross-sectional view of an exemplary tapered interlayer that includes a tapered zone of varying thickness. As shown in FIG. 3, the tapered zone has a minimum thickness, $T_{min}$, measured at a first boundary of the tapered zone and a maximum thickness, $T_{max}$, measured at a second boundary of the tapered zone. In certain embodiments, $T_{min}$ can be at least about 0.25, at least about 0.40, or at least about 0.60 millimeters (mm) and/or not more than 1.2, not more than about 1.1, or not more than about 1.0 mm. Further, $T_{min}$ can be in the range of 0.25 to 1.2 mm, 0.40 to 1.1 mm, or 0.60 to 1.0 mm. In certain embodiments, $T_{max}$ can be at least about 0.38, at least about 0.53, or at least about 0.76 mm and/or not more than 2.2, not more than about 2.1, or not more than about 2.0 mm. Further, $T_{max}$ can be in the range of 0.38 to 2.2 mm, 0.53 to 2.1 mm, or 0.76 to 2.0 mm. In certain embodiments, the difference between $T_{max}$ and $T_{min}$ can be at least about 0.13, at least about 0.15, at least about 0.20, at least about 0.25, at least about 0.30, at least about 0.35, at least about 0.40 mm and/or not more than 1.2, not more than about 0.90, not more than about 0.85, not more than about 0.80, not more than about 0.75, not more than about 0.70, not more than about 0.65, or not more than about 0.60 mm. Further, the difference between $T_{max}$ and $T_{min}$ can be in the range of 0.13 to 1.2 mm, 0.25 to 0.75 mm, or 0.40 to 0.60 mm. In certain embodiments, the distance between the first and second boundaries of the tapered zone (i.e. the "tapered zone width") can be at least about 5, at least about 10, at least about 15, at least about 20, or at least about 30 centimeters (cm) and/or not more than about 200, not more than about 150, not more than about 125, not more than about 100 or not more than about 75 cm. Further, the tapered zone width can be in the range of 5 to 200 cm, 15 to 125 cm, or 30 to 75 cm.

As shown in FIG. 3, the tapered interlayer includes opposite first and second outer terminal edges. In certain embodiments, the distance between the first and second outer terminal edges (i.e., the "interlayer width") can be at least about 20, at least about 40, or at least about 60 cm and/or not more than about 400, not more than about 200, or not more than about 100 cm. Further the interlayer width can be in the range of 20 to 400 cm, 40 to 200 cm, or 60 to 100 cm. In the embodiment depicted in FIG. 3, the first and second boundaries of the tapered zone are spaced inwardly from the first and second outer terminal edges of the interlayer. In such embodiments, only a portion of the interlayer is tapered. When the tapered zone forms only a portion of the interlayer, the ratio of the interlayer width to the tapered zone width can be at least about 0.05:1, at least about 0.10:1, at least about 0.20:1, at least about 0.30:1, at least about 0.40:1 at least about 0.50:1, at least about 0.60:1, or at least about 0.70:1 and/or not more than about 1:1, not more than about 0.95:1, not more than about 0.90:1, not more than about 0.80:1, or not more than about 0.70:1. Further, the ratio of interlayer width to the tapered zone width can be in the range of 0.05:1 to 1:1 or 0.30:1 to 0.90:1. In an alternative embodiment, discussed below, the entire interlayer is tapered. When the entire interlayer is tapered, the tapered zone width is equal to the interlayer width and the first and second boundaries of the tapered zone are located at the first and second terminal edges, respectively.

As illustrated in FIG. 3, the tapered zone of the interlayer has a wedge angle (θ), which is defined as the angle formed between a first reference line extending through two points of the interlayer where the first and second tapered zone boundaries intersect a first (upper) surface of the interlayer and a second reference line extending through two points where the first and second tapered zone boundaries intersect a second (lower) surface of the interlayer. In certain embodiments, the wedge angle of the tapered zone can be at least about 0.10, at least about 0.13, at least about 0.15, at least about 0.20, at least about 0.25, at least about 0.30, at least about 0.35, or at least about 0.40 milliradians (mrad) and/or not more than about 1.2, not more than about 1.0, not more than about 0.90, not more than about 0.85, not more than about 0.80, not more than about 0.75, not more than about 0.70, not more than about 0.65, or not more than about 0.60 mrad. Further, the wedge angle of the tapered zone can be in the range of 0.10 to 1.2 mrad, 0.13 to 1.0 mrad, 0.25 to 0.75 mrad, or 0.40 to 0.60 mrad.

When the first and second surfaces of the tapered zone are each planar, the wedge angle of the tapered zone is simply the angle between the first (upper) and second (lower) surfaces. However, as discussed in further detail below, in certain embodiments, the tapered zone can include at least one variable angle zone having a curved thickness profile and a continuously varying wedge angle. Further, in certain embodiments, the tapered zone can include two or more constant angle zones, where the constant angle zones each have a linear thickness profile, but at least two of the constant angle zones have different wedge angles.

Figure 4:
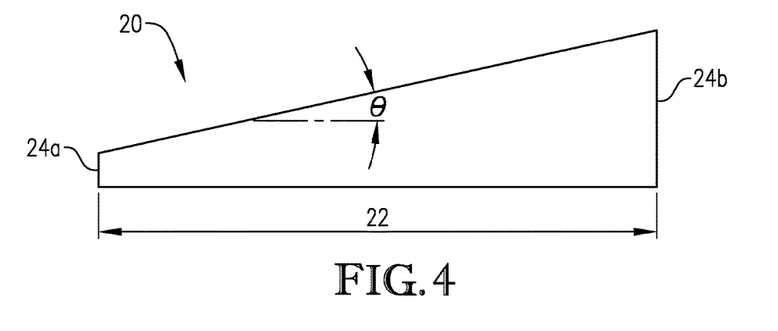
FIG. 4 is a cross-sectional view of a tapered interlayer having a tapered zone that extends over the entire width of the interlayer, wherein the entire tapered zone has a constant wedge angle and a linear thickness profile.

FIGS. 4-9 illustrate various tapered interlayers configured according embodiments of the present invention. FIG. 4 depicts an interlayer 20 that includes a tapered zone 22 extending entirely from a first terminal edge 24a of the interlayer 20 to a second terminal edge 24b of the interlayer 20. In this configuration, the first and second boundaries of the tapered zone are located at the first and second terminal edges 24a,b of the interlayer. The entire tapered zone 22 of the interlayer 20 depicted in FIG. 4 has a constant wedge angle θ that is simply the angle formed between the planar first (upper) and second (lower) planar surfaces of the interlayer 20.

Figure 5:
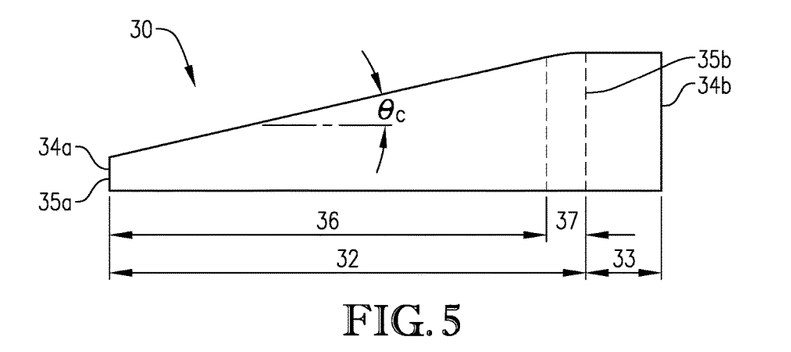
FIG. 5 is a cross-sectional view of a tapered interlayer having a tapered zone that extends over part of the width of the interlayer and a flat edge zone that extends over part of the width of the interlayer, wherein the tapered zone includes a constant angle zone and a variable angle zone.

FIG. 5 illustrates an interlayer 30 that includes a tapered zone 32 and a flat edge zone 33. The first boundary 35a of the tapered zone 32 is located at the first terminal edge 34a of the interlayer 30, while the second boundary 35b of the tapered zone 32 is located where the tapered zone 32 and the flat edge zone 33 meet. The tapered zone 32 includes a constant angle zone 36 and a variable angle zone 37. The constant angle zone 36 has a linear thickness profile and a constant wedge angle, $θ_c$, while the variable angle zone 37 has a curved thickness profile and a continuously varying wedge angle. The starting wedge angle of the variable angle zone 37 is equal to the constant wedge angle $θ_c$ and the ending wedge angle of the variable angle zone 37 is zero. The interlayer 30 depicted in FIG. 5 has a constant wedge angle $θ_c$ that is greater than the overall wedge angle of the entire tapered zone 32.

Figure 6:
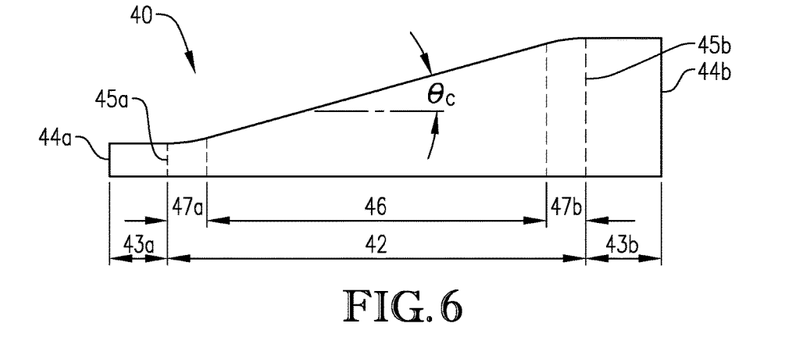
FIG. 6 is a cross-sectional view of a tapered interlayer having a tapered zone that extends over part of the width of the interlayer and two flat edge zones that extend over part of the width of the interlayer, wherein the tapered zone includes a constant angle zone and two variable angle zones.

FIG. 6 illustrates an interlayer 40 that includes a tapered zone 42 located between first and second flat edge zones 43a,b. The first boundary 45a of the tapered zone 42 is located where the tapered zone 42 and the first flat edge zone 43a meet, while the second boundary 45b of the tapered zone 42 is located where the tapered zone 42 and the second flat edge zone 43b meet. The tapered zone 42 includes a constant angle zone 46 located between first and second variable angle zones 47a,b. The first variable angle zone 47a forms a transition zone between the first flat edge zone 43a and the constant angle zone 46. The second variable angle zone 47b forms a transition zone between the second flat edge zone 43b and the constant angle zone 46. The constant angle zone 46 has a linear thickness profile and a constant wedge angle, $θ_c$, while the first and second variable angle zones 47a,b have curved thickness profiles and continuously varying wedge angles. The starting wedge angle of the first variable angle zone 47a is equal to zero and the ending wedge angle of the first variable angle zone 47b is equal to the constant wedge angle $θ_c$. The starting wedge angle of the second variable angle zone 47b is equal to the constant wedge angle $θ_c$ and the ending wedge angle of the second variable angle zone 47b is zero. The interlayer 40 depicted in FIG. 4 has a constant wedge angle $θ_c$ that is greater than the overall wedge angle of the entire tapered zone 42.

Figure 7:
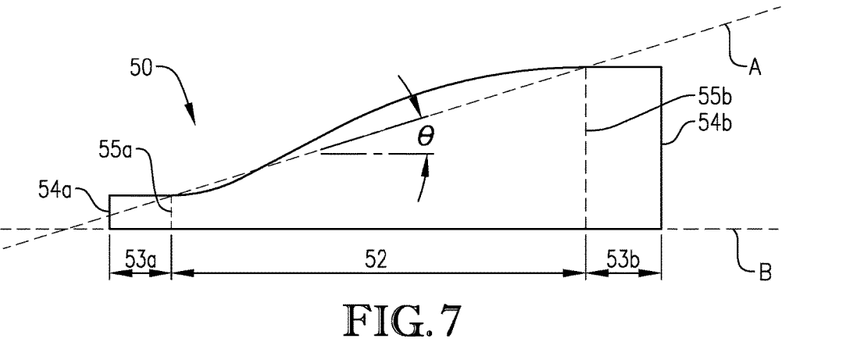
FIG. 7 is a cross-sectional view of a tapered interlayer having a tapered zone that extends over part of the width of the interlayer and two flat edge zones that extend over part of the width of the interlayer, wherein the tapered zone is formed entirely of a variable angle zones having a curved thickness profile.

FIG. 7 illustrates an interlayer 50 that includes a tapered zone 52 located between first and second flat edge zones 53a,b. The tapered zone 52 of the interlayer 50 does not include a constant angle zone. Rather, the entire tapered zone 52 of the interlayer 50 is a variable angle zone having a curved thickness profile and a continuously varying wedge angle. As described above, the overall wedge angle, θ, of the tapered zone 52 is measured as the angle between a first reference line "A" extending through the two points where the first and second boundaries 55a,b of the tapered zone 52 meet the first (upper) surface of the interlayer 50 and a second reference line "B" extending through the two points where the first and second boundaries 55a,b of the tapered zone 52 meet the second (lower) surface of the interlayer 50. However, within the tapered zone 52, the curved thickness profile provides an infinite number of wedge angles, which can be greater than, less than, or equal to the overall wedge angle θ of the entire tapered zone 52.

Figure 8:
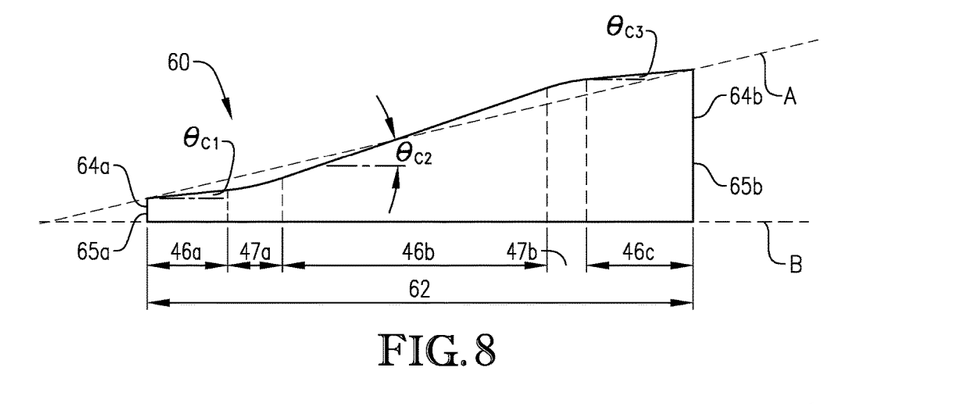
FIG. 8 is a cross-sectional view of a tapered interlayer having a tapered zone that extends over the entire width of the interlayer, wherein the tapered includes three constant angle zones spaced from one another by two variable angle zones.

FIG. 8 illustrates an interlayer 60 that does not include any flat end portions. Rather, the tapered zone 62 of the interlayer 60 forms the entire interlayer 60. Thus, the first and second boundaries 65a,b of the tapered zone 60 are located at the first and second terminal edges 64a,b of the interlayer 60. The tapered zone 62 of the interlayer 60 includes first, second, and third constant angle zones 46a-c separated by first and second variable angle zones 47a,b. The first, second, and third constant angle zones 46a-c each have a linear thickness profile and each have unique first, second, and third constant wedge angles, $θ_{c1}$, $θ_{c2}$, $θ_{c3}$, respectively The first variable angle zone 47a acts as a transition zone between the first and second constant angle zones 46a,b. The second variable angle zone 47b acts as a transition zone between the second and third constant angle zones 46b,c. As discussed above, the overall wedge angle, θ, of the tapered zone 62 is measured as the angle between a first reference line "A" and a second reference line "B." The first constant wedge angle $θ_{c1}$ is less than the overall wedge angle θ of the tapered zone 62. The second constant wedge angle $θ_{c2}$ is greater the overall wedge angle θ of the tapered zone 62. The third constant wedge angle $θ_{c3}$ is less than the overall wedge angle θ of the tapered zone 62. The wedge angle of the first variable angle zone 47a continuously increases from the first constant wedge angle $θ_{c1}$ to the second constant wedge angle, $θ_{c2}$. The wedge angle of the second variable angle zone 47b continuously decreases from the second constant wedge angle $θ_{c2}$ to the third wedge angle $η_{c3}$.

Figure 9:
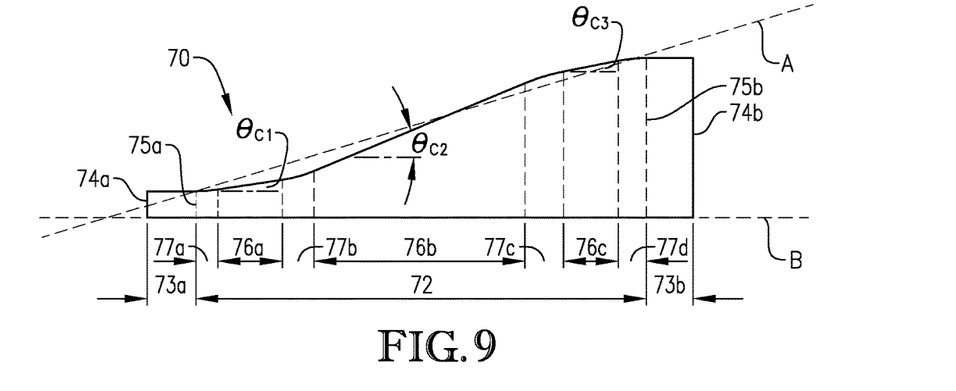
FIG. 9 is a cross-sectional view of a tapered interlayer having a tapered zone that extends over part of the width of the interlayer and two flat edge zones that extend over part of the width of the interlayer, wherein the tapered zone includes three constant angle zones and four variable angle zones.

FIG. 9 illustrates an interlayer 70 that includes a tapered zone 72 located between first and second flat edge zones 73a,b. The first and second boundaries 75a,b of the tapered zone 72 are spaced inwardly from the first and second outer edges 74a,b of the interlayer 70. The tapered zone 72 of the interlayer 70 includes first, second, third, and fourth variable angle zones 77a-d and first, second, and third constant angle zones 76a-c. The first variable angle zone 77a acts as a transition zone between the first flat edge zone 73a and the first constant angle zone 76a. The second variable angle zone 77b acts as a transition zone between the first constant angle zone 76a and the second constant angle zone 76b. The third variable angle zone 77c acts as a transition zone between the second constant angle zone 76b and the third constant angle zone 76c. The fourth variable angle zone 77d acts as a transition zone between the third constant angle zone 76c and the second flat edge zone 73b. The first, second, and third constant angle zones 76a-c each have a linear thickness profile and each have unique first, second, and third constant wedge angles, $θ_{c1}$, $θ_{c2}$, $θ_{c3}$, respectively As discussed above, the first, second, third, and fourth variable angle zones 77a-d have wedge angles that continuously transition from the wedge angle of the constant angle zone on one side of the variable angle zone 77 to the wedge angle of the constant angle zone on the other side of the variable angle zone 77.

As discussed above, the tapered interlayer can include one or more constant angle tapered zones, each having a width that is less than the overall width of the entire tapered zone. Each tapered zone can have a wedge angle that is the same as or different than the overall wedge angle of the entire tapered zone. For example, the tapered zone can include one, two, three, four, five or more constant angle tapered zones. When multiple constant angle tapered zones are employed, the constant angle tapered zones can be separated from one another by variable angle tapered zones that serve to transition between adjacent constant angle tapered zones.

In certain embodiments, the width of each constant angle tapered zone can be at least about 2, at least about 5, at least about 10, at least about 15, or at least about 20 cm and/or not more than about 150, not more than about 100, or not more than about 50 cm. In certain embodiments, the ratio of the width of each constant angle tapered zone to the overall width of the entire tapered zone can be at least about 0.1:1, at least about 0.2:1, at least about 0.3:1 or at least about 0.4:1 and/or not more than about 0.9:1, not more than about 0.8:1, not more than about 0.7:1, not more than about 0.6:1, or not more than about 0.5:1.

In certain embodiments, the wedge angle of each constant angle tapered zone can be at least about 0.13, at least about 0.15, at least about 0.20, at least about 0.25, at least about 0.30, at least about 0.35, at least about 0.40 mrad and/or not more than about 1.2, not more than about 1.0, not more than about 0.90, not more than about 0.85, not more than about 0.80, not more than about 0.75, not more than about 0.70, not more than about 0.65, or not more than about 0.60 mrad. Further, the wedge angle of each constant angle tapered zone can be in the range of 0.13 to 1.2 mrad, 0.25 to 0.75 mrad, or 0.40 to 0.60 mrad. In certain embodiments, the wedge angle of at least one constant angle tapered zone is at least about 0.01, at least about 0.05, at least about 0.10, at least about 0.20, at least about 0.30, or at least about 0.40 mrad greater than the overall wedge angle of the entire tapered zone. In certain embodiments, the wedge angle of at least one constant angle tapered zone is at least about 0.01, at least about 0.05, at least about 0.10, at least about 0.20, at least about 0.30, or at least about 0.40 mrad less than the overall wedge angle of the entire tapered zone. In certain embodiments, the wedge angle of at least one constant angle tapered zone is not more than about 0.40, not more than about 0.30, not more than about 0.20, not more than about 0.10, not more than about 0.05, or not more than about 0.01 mrad greater than the overall wedge angle of the entire tapered zone. In certain embodiments, the wedge angle of at least one constant angle tapered zone is not more than about 0.40, not more than about 0.30, not more than about 0.20, not more than about 0.10, not more than about 0.05, or not more than about 0.01 mrad less than the overall wedge angle of the entire tapered zone.

Figure 10A:
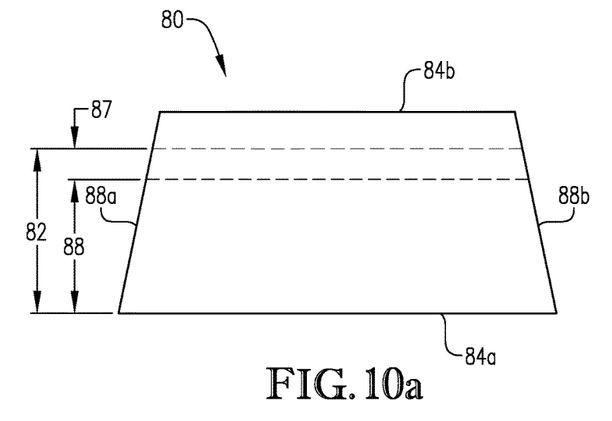
FIG. 10a is a plan view of a tapered interlayer configured for use in a vehicle windshield, wherein the thickness profile of the interlayer is similar to the thickness profile of the interlayer depicted in FIG. 4.
Figure 10B:
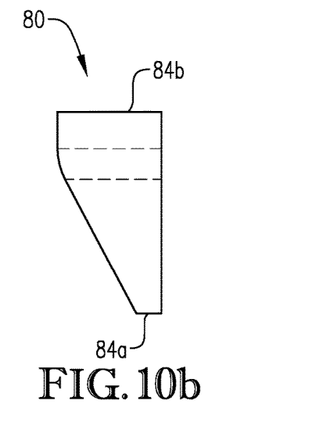
FIG. 10b is a cross-sectional view of the interlayer of FIG. 10a, showing the thickness profile of the interlayer.

FIGS. 10a and 10b illustrate an interlayer 80 that is similar in thickness profile to the interlayer 30 of FIG. 5. The interlayer 80 of FIGS. 10a and 10b is configured for use in a vehicle windshield by fixing the interlayer between two sheets of glass. As depicted in FIG. 10a, the first terminal edge 84a of the interlayer 80 can be located at the bottom of the windshield, while the second terminal edge 84b of the interlayer 80 can be located at the top of the windshield. The tapered zone 82 of the interlayer 80 is positioned in an area of the windshield where a heads-up display is to be located. The tapered zone 82 of interlayer 80 includes a constant angle zone 86 and a variable angle zone 87. As depicted in FIG. 10a, in certain embodiments, the tapered zone 82 extends entirely across the interlayer 80 between a first side edge 88*a* and a second side edge 88*b* of the interlayer 80. FIG. 10*b*, which is similar to FIG. 5, shows the thickness profile of the interlayer 80 between the bottom of the windshield and the top of the windshield.

When assembled in a multiple layer panel according to various embodiments of the present invention, multiple layer interlayers as described herein can exhibit desirable properties, including desirable acoustic and optical properties. Clarity is one parameter used to describe the optical performance of the interlayers described herein and may be determined by, for example, measuring the haze value of the interlayer. The haze value represents the quantification of light scattered by a sample in contrast to the incident light. In some embodiments, a multiple layer interlayer according to the present invention may have a haze value of less than about 3 percent, less than about 2 percent, less than about 1 percent, or less than about 0.5 percent, as measured in accordance with ASTM D1003-13—Procedure B using Illuminant C, at an observer angle of 2 degrees. The test is performed with a spectrophotometer, such as a Hunterlab UltraScan XE instrument (commercially available from Hunter Associates, Reston, Va.), on a polymer sample having a thickness of 0.76 mm, which has been laminated between two sheets of clear glass each having a thickness of 2.3 mm (commercially available from Pittsburgh Glass Works of Pennsylvania).

It was also discovered that multiple layer interlayers configured according to embodiments of the present invention have a reduced tendency to form iceflower defects when exposed to extreme processing and/or environmental conditions. In some embodiments, for example, multiple layer interlayers as described herein can have an average iceflower formation rate of not more than about 40 percent, not more than about 35 percent, not more than about 30 percent, not more than about 25 percent, not more than about 20 percent, not more than about 15 percent, not more than about 10 percent, not more than about 5 percent, not more than about 2 percent, or not more than about 1 percent, when tested according the following procedure.

A poly(ethylene terephthalate) (PET) ring having an inner diameter of 7.5 cm, an outer diameter of 14 cm, and a thickness between 0.10 and 0.18 mm is centered on the top of a 30 cm×30 cm interlayer. The interlayer and PET ring are then sandwiched between two 30 cm×30 cm sheets of clear glass and the construct is pre-laminated and autoclaved. The resulting laminates are conditioned at room temperature for 48 hours before being heated in a conventional oven at 80° C. for 48 hours. The resulting laminates are allowed to cool and are visually inspected to determine the rate of iceflower formation in the laminate. The "rate of iceflower formation" is defined as the percentage area within the PET ring exhibiting an iceflower defect. The above procedure is repeated on nine other samples of the same interlayer and an average of the iceflower formation rates is calculated to determine the average iceflower formation rate of the interlayer.

Multiple layer interlayers according to embodiments of the present invention may also exhibit desirable acoustic properties, as indicated by, for example, the reduction in the transmission of sound as it passes through (i.e., the sound transmission loss of) the interlayer. In some embodiments, the sound transmission loss of a multiple layer interlayer configured according to the present invention can be at least about 35, at least about 35.5, at least about 36, at least about 36.5, at least about 37, at least about 37.5, at least about 38, at least about 38.5, at least about 39, at least about 39.5, or at least about 40 dB, measured according to ASTM E90 (2009) at a temperature of 20° C. and a frequency of 3150 Hz, with a test panel having a length of 80 centimeters and a width of 50 centimeters, formed with glass panels having a thickness of 2.3 mm each.

Multiple layer interlayers as described herein can achieve a sound transmission loss within one or more of the above ranges, while having a relatively thin acoustic polymer layer. For example, in some embodiments, the multiple layer interlayer may achieve a sound transmission loss as described above, yet none of the polymer layers having a glass transition temperature of not more than 25, not more than about 20, not more than about 15, not more than about 10, not more than about 5, not more than about 0, not more than about −5, or not more than about −10° C. can have a thickness greater than about 75, greater than about 65, greater than about 55, greater than about 50, greater than about 49, greater than about 45, greater than about 40, greater than about 35, greater than about 30, greater than about 25, greater than about 20, greater than about 15, greater than about 10, greater than about 5, greater than about 4, greater than about 2, greater than about 1, or greater than about 0.5 microns.

The multiple layer interlayers described herein may be produced according to any suitable method. Typically, one or more poly(vinyl acetal) resins, optionally blended with at least one plasticizer and one or more additives described previously, can be formed into layers and the layers may be combined to form a multiple layer interlayer. Exemplary methods of forming polymer layers can include, but are not limited to, solution casting, compression molding, injection molding, melt extrusion, melt blowing, and combinations thereof. In some embodiments, two or more polymer layers may also be produced by, for example, co-extrusion, blown film, melt blowing, dip coating, solution coating, blade, paddle, air-knife, printing, powder coating, spray coating, and combinations thereof.

In various embodiments of the present invention, the layers or interlayers may be formed by extrusion or co-extrusion. In an extrusion process, one or more thermoplastic polymers, plasticizers, and, optionally, at least one additive, can be pre-mixed and fed into an extrusion device. Other additives, such as ACAs, colorants, and UV inhibitors, which can be in liquid, powder, or pellet form, may also be used and may be mixed into the thermoplastic polymers or plasticizers prior to introduction into the extrusion device. These additives can be incorporated into the polymer resin and, ultimately, into the resultant resin sheet, thereby enhancing certain properties of the interlayer and improving the performance of a multiple layer glass panel or other end product formed with the interlayer.

In some embodiments, the multiple layer interlayer can be formed using a co-extrusion process with a layer multiplier system. Such systems utilize one or more dividing elements within the die feed block for dividing and rejoining thin polymer melt streams in order to form sheets with alternating polymer layers. In some embodiments, the dividing elements may be capable of forming any number of layers and may, for example, be capable of forming resin sheets having n total layers, as described above.

Generally, such layer multiplier systems may be capable of forming resin sheets having an even number of layers. Therefore, when the multiple layer interlayer further includes a cap polymer layer, as shown in FIGS. 1 and 2, the cap polymer layer may be separately co-extruded with, or otherwise added to, the multiple layer sheet to form the final interlayer. Alternatively, the cap polymer layer, when present, may be added to the multiple layer sheet according to any suitable manner, including one or more of the methods mentioned previously, and may be added at the same time the multiple layer sheet is being formed, or subsequent to its formation as a post-extrusion process step.

The resin compositions, layers, and interlayers according to embodiments of the present invention may be utilized in a multiple layer panel that comprises a polymer layer or interlayer and at least one rigid substrate. Any suitable rigid substrate may be used and in some embodiments may be selected from the group consisting of glass, polycarbonate, biaxially oriented PET, copolyesters, acrylic, and combinations thereof. When the rigid substrate includes a polymeric material, the polymeric material may or may not include a hard coat surface layer. In some embodiments, the multilayer panels include a pair of rigid substrates with the resin interlayer disposed therebetween. The panels can be used for a variety of end use applications, including, for example, for automotive windshields and windows, aircraft windshields and windows, panels for various transportation applications such as marine applications, rail applications, etc., structural architectural panels such as windows, doors, stairs, walkways, balusters, decorative architectural panels, weather-resistant panels, such as hurricane glass or tornado glass, ballistic panels, and other similar applications.

When laminating the multiple layer interlayers described herein between two rigid substrates, such as glass, the process can include at least the following steps: (1) assembly of the two substrates and the interlayer; (2) heating the assembly via an IR radiant or convective device for a first, short period of time; (3) passing the assembly into a pressure nip roll for the first de-airing; (4) heating the assembly for a short period of time to about 60° C. to about 120° C. to give the assembly enough temporary adhesion to seal the edge of the interlayer; (5) passing the assembly into a second pressure nip roll to further seal the edge of the interlayer and allow further handling; and (6) autoclaving the assembly at temperature between 135° C. and 150° C. and pressures between 150 psig and 200 psig for about 30 to 90 minutes. Other methods for de-airing the interlayer-glass interface, as described according to some embodiments in steps (2) through (5) above include vacuum bag and vacuum ring processes, and both may also be used to form interlayers of the present invention as described herein.

The following examples are intended to be illustrative of the present invention in order to teach one of ordinary skill in the art to make and use the invention and are not intended to limit the scope of the invention in any way.

EXAMPLE

A single layer Comparative Interlayer (CI-1) was formed by melt blending a poly(vinyl butyral) resin having a residual hydroxyl content of 19 weight percent and a residual acetate content of less than 2 weight percent ("Resin B") with 38 phr of triethylene glycol di-(2-ethylhexanoate) ("3GEH") plasticizer and extruding the resulting plasticized resin to form a polymer sheet having a thickness of 760 microns.

The Comparative Interlayer (CI-2) and the Disclosed Interlayers (DI-1 through DI-4) were produced according to the following method. A three-layer Comparative Interlayer (CI-2) was formed by co-extruding Resin B, which was plasticized initially with 41.5 phr of 3GEH, with Resin A, which was melt blended with 50 phr of 3GEH initially. The resulting interlayer included a pair of outer layers of plasticized Resin B sandwiching an inner layer formed of plasticized Resin A. The initial plasticizer contents in Resin A layer and Resin B layer were not at equilibrium and partitioned between the layers to reach an equilibrium state. The final plasticizer contents of each of these layers are provided in Table 1, below. The thicknesses of Resin A layer and Resin B layer were extruded such that the final thicknesses, after achievement of plasticizer equilibrium, were the same as shown in Table 1.

The Disclosed Interlayers (DI-1 through DI-4) were formed by co-extruding Resin B, which was plasticized initially with 41.5 phr of 3GEH, or Resin C, which was plasticized initially with 34 phr of 3GEH, with Resin A, which was plasticized initially with 50 phr of 3GEH, into a die feed block including either two or four 4× dividing elements, as previously described. As with the plasticizer partitioning utilized when constructing Comparative Interlayer CI-2, the plasticizer in DI-1 through DI-4 after extrusion was permitted to partition between Resin Layers A and B or between Resin Layers A and C in order to reach its equilibrium state. The thicknesses of Resin A layer, Resin B layer and Resin C layer were extruded such that the final thickness, after the plasticizer reached in the equilibrium state, were as shown in Table 1.

The Disclosed Interlayers (DI-1 through DI-4) having more than three polymer layers can also be formed by co-extruding Resin B, plasticized with 38 phr of 3GEH, or another poly(vinyl acetal) resin having a residual hydroxyl content of 22 weight percent and a residual acetate content of less than 2 weight percent (Resin C), plasticized with 30 phr of 3GEH, with Resin A, plasticized with 75 phr of 3GEH, into a die feed block including either two or four 4× dividing elements. Each dividing element separated the melt streams into a plurality of thinner strands and recombined the strands to form resin sheets having multiple, alternating resins layers. Resin sheets formed with the two 4× dividing elements included 32 total polymer layers, and resin sheets formed with the four 4× dividing elements included 512 total polymer layers. Each Disclosed Interlayer had an overall thickness of 813 microns. The thickness of each of the individual polymer layers in each of the Disclosed Interlayers DI-1 through DI-4 is the same as shown in Table 1, below.

It should be understood that other initial plasticizer loadings in Resin Layers A, B, and C could have been used, as long as the final plasticizer content and thickness of each layer were the same as shown in Table 1. For example, similar interlayers could have been constructed if the initial plasticizer loadings of Resin Layers A, B, and C were, respectively, 60 phr, 40 phr, and 32 phr, as long as the initial thicknesses of these layer were chosen to achieve the final plasticizer contents and the thicknesses of Resin Layers A, B, and C shown in Table 1.

The sound transmission loss for samples of each of Comparative Interlayers CI-1 and CI-2, as well as each of Disclosed Interlayers DI-1 through DI-4, were measured according to ASTM E-90 (2009) at a reference frequency of 3,150 Hz and a temperature of 20° C. as described previously. The results are provided in Table 1, below. Additionally, samples of each of the interlayers were tested for iceflower formation in accordance with the method described previously and were further visually inspected for iceflower formation anywhere on the laminate, including areas inside and outside of the PET circle. For this Example, laminates exhibiting any type of iceflower formation, whether in the PET circle or not, were labeled as exhibiting iceflower defects, and laminates with no formation of iceflowers in or outside of the PET ring were labeled as not forming iceflower defects. Interlayers forming iceflower defects were labeled with a "Yes" in Table 1, while those that did not were labeled with a "No."

TABLE 1

| Interlayer | Interlayer Layout | # of Layers | Resin B/C Layer | | Resin A Layer | | Average Thickness of Resin A Layers (micron) | Total Thickness of Interlayer (micron) | Thickness Ratio of Resin B/C Layers to Overall Thickness | STL at 3,150 Hz (dB) | Iceflower Defect Formation |
|---|---|---|---|---|---|---|---|---|---|---|---|
| | | | Residual Hydroxyl (wt %) | Plasticizer Content (phr) | Residual Hydroxyl (wt %) | Plasticizer Content (phr) | | | | | |
| CI-1 | B | 1 | 19 | 38 | — | — | — | 760 | 1 | 31 | No |
| CI-2 | B/A/B | 3 | 19 | 38 | 11 | 75 | 101.6 | 813 | 0.875 | 40 | Yes |
| DI-1 | B/A/ . . . /A | 32 | 19 | 38 | 11 | 75 | 6.35 | 813 | 0.875 | 40 | No |
| DI-2 | B/A/ . . . /A | 512 | 19 | 38 | 11 | 75 | 0.39 | 813 | 0.875 | 40 | No |
| DI-3 | C/A/ . . . /A | 32 | 22 | 30 | 11 | 75 | 6.35 | 813 | 0.875 | 40 | No |
| DI-4 | C/A/ . . . /A | 512 | 22 | 30 | 11 | 75 | 0.39 | 813 | 0.875 | 40 | No |

As shown in Table 1, above, Disclosed Interlayers DI-1 through DI-4 have a sound transmission loss similar to the sound transmission loss of Comparative Interlayer CI-2, but, unlike Comparative Interlayer CI-2, Disclosed Interlayers DI-1 through DI-4 do not form iceflower defects when exposed to the conditions described above.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, an interlayer can be formed comprising poly(vinyl butyral) having a residual hydroxyl content in any of the ranges given in addition to comprising a plasticizers in any of the ranges given to form many permutations that are within the scope of the present disclosure, but that would be cumbersome to list. Further, ranges provided for a genus or a category, such as phthalates or benzoates, can also be applied to species within the genus or members of the category, such as dioctyl terephthalate, unless otherwise noted.

What is claimed is:

1. A multiple layer interlayer comprising:
   a first polymer layer comprising a poly(vinyl butyral) resin;
   a second polymer layer comprising a second poly(vinyl butyral) resin;
   a third polymer layer comprising a third poly(vinyl butyral) resin;
   a fourth polymer layer comprising a fourth poly(vinyl butyral) resin; and
   a fifth polymer layer comprising a fifth poly(vinyl butyral) resin,
   wherein said second polymer layer is disposed between and in contact with each of said first and said third polymer layers and wherein said fourth polymer layer is disposed between and in contact with each of said third and said fifth polymer layers,
   wherein each of said second and said fourth polymer layers has a glass transition temperature that is at least 3° C. different than the glass transition temperature of at least one of said first, third, and fifth polymer layers, and wherein at least one of said second and said fourth polymer layers has a thickness of less than 50 microns,
   and wherein said first poly(vinyl butyral) resin has a residual hydroxyl content that is at least 2 weight percent different than the residual hydroxyl content of said second poly(vinyl butyral) resin and/or wherein said first poly(vinyl butyral) resin has a residual acetate content that is at least 2 weight percent different than the residual acetate content of said second poly(vinyl butyral) resin.

2. The interlayer of claim 1, wherein said glass transition temperature of at least one of said first, third, and fifth polymer layers is at least 26° C.

3. The interlayer of claim 1, wherein said glass transition temperature of at least one of said second and said fourth polymer layers is not more than 20° C.

4. The interlayer of claim 1, wherein each of said second and said fourth polymer layers has a glass transition temperature that is at least 3° C. lower than the glass transition temperature of at least one of said first, third, and fifth polymer layers.

5. The interlayer of claim 1, wherein each of said second and said fourth polymer layers has a thickness of less than 50 microns.

6. The interlayer of claim 1, wherein the maximum difference between one of the first, third, and fifth residual acetate contents and one of the second and the fourth residual acetate contents is not more than 4 weight percent.

7. The interlayer of claim 1, wherein said first poly(vinyl butyral) resin has a residual hydroxyl content that is at least 4 weight percent different than the residual hydroxyl content of said second poly(vinyl butyral) resin and/or wherein said first poly(vinyl butyral) resin has a residual acetate content that is at least 4 weight percent different than the residual acetate content of said second poly(vinyl butyral) resin.

8. The interlayer of claim 1, wherein said first polymer layer has a glass transition temperature that is at least 3° C. higher than said glass transition temperature of said second polymer layer, and wherein said fifth polymer layer has a glass transition temperature that is at least 3° C. higher than said glass transition temperature of said fourth polymer layer.

9. The interlayer of claim 1, wherein said interlayer comprises at least one tapered zone having a minimum wedge angle of at least 0.10 mrad.

10. The interlayer of claim 1, wherein said interlayer has a sound transmission loss of at least 35 dB, measured according to ASTM E90 (2009) at a temperature of 20° C. and a frequency of 3150 Hz, with a test panel having a length of 80 centimeters and a width of 50 centimeters, formed from two clear glass panels each having a thickness of 2.3 mm.

11. The interlayer of claim 1, wherein the residual hydroxy content of at least one of said second and said fourth polymer layers is less than 16 weight percent.

12. A multiple layer interlayer comprising:
at least 3 pairs of alternating polymer layers, wherein each of said pairs of alternating polymer layers comprises—
a first polymer layer comprising a first poly(vinyl butyral) resin and at least one plasticizer; and
a second polymer layer adjacent to said first polymer layer, wherein said second polymer layer comprises a second poly(vinyl butyral) resin and at least one plasticizer;
wherein, for at least one of said pairs, said first poly(vinyl butyral) resin has a residual hydroxyl content that is at least 2 weight percent different than the residual hydroxyl content of said second poly(vinyl butyral) resin and/or wherein said first poly(vinyl butyral) resin has a residual acetate content that is at least 2 weight percent different than the residual acetate content of said second poly(vinyl butyral) resin, and
wherein said second polymer layer in at least one of said pairs has an average thickness of less than 50 microns.

13. The interlayer of claim 12, wherein said residual hydroxyl content of said first poly(vinyl butyral) resin is at least 4 weight percent higher than said residual hydroxyl content of said second poly(vinyl butyral) resin.

14. The interlayer of claim 12, wherein said residual acetate content of said first poly(vinyl butyral) resin is at least 4 weight percent higher than said residual hydroxyl content of said second poly(vinyl butyral) resin.

15. The interlayer of claim 12, wherein said interlayer has a sound transmission loss of at least 35 dB, measured according to ASTM E90 (2009) at a temperature of 20° C. and a frequency of 3150 Hz, with a test panel having a length of 80 centimeters and a width of 50 centimeters, formed from two clear glass panels each having a thickness of 2.3 mm.

16. The interlayer of claim 12, wherein said second polymer layer has a glass transition temperature that is at least 3° C. different than the glass transition temperature of said first polymer layer.

17. The interlayer of claim 12, wherein the residual hydroxyl content of said second poly(vinyl butyral) resin is less than 16 weight percent.

18. The interlayer of claim 12, wherein said interlayer comprises at least one tapered zone having a minimum wedge angle of at least 0.10 mrad.

19. The interlayer of claim 12, wherein said tapered zone comprises at least one variable angle zone having a curved thickness profile.

20. A multiple layer interlayer comprising:
at least 3 pairs of alternating polymer layers, wherein each of said pairs of alternating polymer layers comprises—
a first polymer layer comprising a first poly(vinyl butyral) resin and at least one plasticizer; and
a second polymer layer adjacent to said first polymer layer, wherein said second polymer layer comprises a second poly(vinyl butyral) resin and at least one plasticizer;
wherein said first poly(vinyl butyral) resin has a residual hydroxyl content that is at least 2 weight percent different than the residual hydroxyl content of said second poly(vinyl butyral) resin,
wherein the residual hydroxyl content of said second poly(vinyl butyral) resin is less than 16 weight percent, and wherein said second polymer layer has a glass transition temperature that is at least 3° C. different than the glass transition temperature of said first polymer layer, and wherein said second polymer layer in at least one of said pairs has an average thickness of less than 50 microns.

\* \* \* \* \*